United States Patent [19]

Blaschke et al.

[11] 4,338,559
[45] Jul. 6, 1982

[54] LOAD STATE CONTROL FOR AN ASYNCHRONOUS MACHINE FED BY A CONVERTER

[75] Inventors: Felix Blaschke; Leonhard Reng, both of Erlangen, Fed. Rep. of Germany

[73] Assignee: Siemens Aktiengesellschaft, Munich, Fed. Rep. of Germany

[21] Appl. No.: 148,144

[22] Filed: May 9, 1980

[30] Foreign Application Priority Data

May 16, 1979 [DE] Fed. Rep. of Germany ....... 2919852

[51] Int. Cl.³ ............................................. H02P 5/40
[52] U.S. Cl. .................................... 318/805; 318/803; 363/47
[58] Field of Search ................ 318/798, 799, 801–803, 318/805; 363/34, 37

[56] References Cited

U.S. PATENT DOCUMENTS

| | | | |
|---|---|---|---|
| 3,796,935 | 3/1974 | Blaschke | 318/801 |
| 3,919,609 | 11/1975 | Klautschek et al. | 318/803 |
| 4,119,893 | 10/1978 | Bayer et al. | 318/798 X |
| 4,215,304 | 7/1980 | D'Atre et al. | 318/803 X |

Primary Examiner—A. D. Pellinen
Attorney, Agent, or Firm—Kenyon & Kenyon

[57] ABSTRACT

A control unit for regulating an asynchronous motor supplied with power from a three phase network by a line-controlled power converter which is DC coupled to a self-commutated inverter has a function generator and a current regulator which controls the stator current of the motor by the controlling rectifier valves in the inverter. Control of the stator current is a function of a predeterminable value of flux fed into the function generator. In a parallel control system, an actual-value computer and a load state control regulate the stator frequency by generating a signal for controlling the self-commutating converter as a function of the actual values of the stator current, the stator voltage, and a value calculated from the function generator input variable. The computer forms signals corresponding to the amplitude of the flux vector, and to a stator current component perpendicular to the flux vector. A variable derived from the predeterminable variable is applied to the load state control as a reference value. Fall-out-proof, low oscillation, speed control is effected from low angles to nearly 90°.

11 Claims, 5 Drawing Figures

LOAD STATE CONTROL FOR AN ASYNCHRONOUS MACHINE FED BY A CONVERTER

BACKGROUND OF THE INVENTION

This invention relates to a circuit for controlling an asynchronous machine which is fed by a frequency converter (static frequency changer) having a line-controlled rectifier connected to a three-phase network, an intermediate DC link and a self-commutated inverter. More particularly, the invention relates to such a circuit in which a current control, having a function generator and a current regulator for the stator current, controls valves of the line-commutated rectifier to a desired value derived from an input variable fed to the function generator, the level of the flux being given. A parallel control system is provided for the stator frequency and comprises an actual-value computer and a load state control for supplying a frequency correction variable to the control unit of the self-commutating converter in accordance with the difference between a load state variable calculated from the actual values of the stator current and the stator voltage and a desired load state value calculated from the input variable of the function generator.

An arrangement of the above type can be used to predetermine a given torque for an asynchronous machine by setting an appropriate input variable into the input of the function generator. The arrangement can also be used for controlling the speed of an asynchronous machine by means of a speed control having an output control difference which is fed to the function generator input via a controller.

An arrangement of this type is described in Siemens-Zeitschrift 45 (1971), at pages 195 to 197. There, the electrical torque of the asynchronous machine is used as the load state variable. An actual value of this torque is calculated from the instantaneous values of the stator current and the stator voltage in an actual-value computer. The output variable of a speed controller, into which the control difference of the stator frequency is fed, serves as the reference value. A reference value for the slip frequency is formed in a torque control in which the control difference between the calculated actual instantaneous value and the output variable of the speed controller corresponding to the desired instantaneous value are fed. The correcting variable for the stator frequency, which addresses the control unit for the valves of the self-commutating converter, is formed from the reference value in the slip frequency in a subsequent computing stage, taking into account the actual speed value of the asynchronous machine. Further, the output of the speed controller is fed to a function generator which furnishes, from a predetermined (set-in) characteristic, the reference value for the DC current in the intermediate link. The characteristic of the function generator is set so that the motor operates with a constant, rated flux and therefore can develop full torque at any speed. A secondary current controller forms a control variable for the control unit controlling the valves of the line-commutated converter from this current reference value and from an actual current value taken from the intermediate DC link.

According to the underlying control concept, the stator frequency control causes the stator current vector i (the magnitude of which is given by the current control loop) to ultimately follow the rotating main flux vector $\psi$ in such a way that the stator current component parallel to the flux vector (the magnetizing current $i_{\phi 1}$) controls the magnitude of the flux to be held constant, and the stator current component perpendicular thereto (the active current $i_{\phi 2}$) controls the preset torque. However, the dependence of the torque on the angle between the main flux vector and the stator current vector (the load angle) is maximum at 45°. For load angles above 45°, a load at the shaft of the asynchronous machine, which is beyond the actual value of the torque and tends to lower the speed, also leads to a further reduction of the torque delivered and, ultimately, to stopping the machine (falling out). For protection against falling out at load angles above 45°, it is therefore necessary in the known arrangement to linearize the characteristic in the actual-value computer; this is not detailed, however. In this control concept, moreover, weakened-field operation is not indicated and is possible only at additional cost.

The present invention provides, in an arrangement of the above-mentioned kind but through the use of a different load state variable, an improved control concept which is fallout-proof at load angles above 45° and which allows simple steps for further improvement, depending on the respective application. Thus, operation with field-weakening can be carried out easily, and measures for stabilization (damping of oscillations) and/or for pullout protection at load angles of up to nearly 90° involve only slight extra cost. This is of advantage, for instance, where blowers, centrifugal pumps, stirrers or centrifuges are being driven. A tachometer generator for measuring the speed is not necessary. The use of tachometer generators is not precluded, however; and such may be used for more stringent requirements.

SUMMARY OF THE INVENTION

According to the invention, a variable ($\psi$) proportional to the magnitude of the flux vector ($\psi$) and to the component perpendicular to flux vector (active current $i_{\phi 2}$) of the stator current vector (i) is formed in the actual-value computer of an arrangement of the kind described at the outset. The variable ($\psi$) proportional to the magnitude of the flux is fed to the dividend input and the variable ($i_{\phi 2}$) proportional to the perpendicular stator current component is fed to the divisor input of a first divider stage. The output variable of the first divider stage is connected as an actual value, and a corresponding variable derived from the input of the function generator is connected to the load state control as a reference value for the load state variable. For forming the load state variable reference value, preferably the input variable of the function generator is fed to the dividend input of a second divider stage, and a reference variable corresponding to a preset value of the magnitude of the flux, for instance, the rated value of the main flux, is fed to the divisor input of this second divider stage.

The load state variable $W = i_{\phi 2}/\psi$ corresponds, in the steady-state case, to the tangent of the load angle $\Sigma$ (see FIG. 5. In this figure, the main flux vector $\psi$ (rotating relative to a stator-related axis $\alpha_1$) and the components $i_{\phi 1}$ and $i_{\phi 2}$ of the stator current vector i (also rotating) are shown. If the reference value W* is formed as the quotient of corresponding reference values for the active current and the flux, then the active current and the flux can be influenced separately from each other. This makes operation with weakened field possible by, for instance, setting the flux reference value proportional to the quotient of the nominal flux and the speed as soon as the terminal voltage exceeds the nominal (rated) value.

In the following, the same symbols are used for the main flux vector $\psi$ and for the components of the stator current vector as are used for the electrical quantities proportional thereto.

Since the actual-value computer already computes the active current $i_{\phi 2}$, from the stator-related components of the stator current, the extra cost of also computing the magnetizing current $i_{\phi 1}$ is insignificant. In a further embodiment of the invention, the variable $i_{\phi 1}$ is added to the value of the flux at the divisor input of the first divider stage via "elastic" stage. This leads to a stabilization of the asynchronous machine against oscillations in the event of load state changes. It may also be advantageous to add the variable $i_{\phi 1}$ to the variable at the divisor input of the first divider stage via a threshold circuit which passes essentially only negative values for $i_{\phi 1}$ (i.e., values wich are below a negative or a small positive threshold value). In this way, the machine can be operated steady-state at load angles up to nearly 90° without falling-out in the event of disturbances which lead to sudden frequency or phase changes.

BRIEF DESCRIPTION OF THE DRAWINGS

FIG. 5 is a diagram showing the relationship between the load angle, the main flux vector, and the two components of the stator current vector.

DETAILED DESCRIPTION OF THE INVENTION

Figure 1:
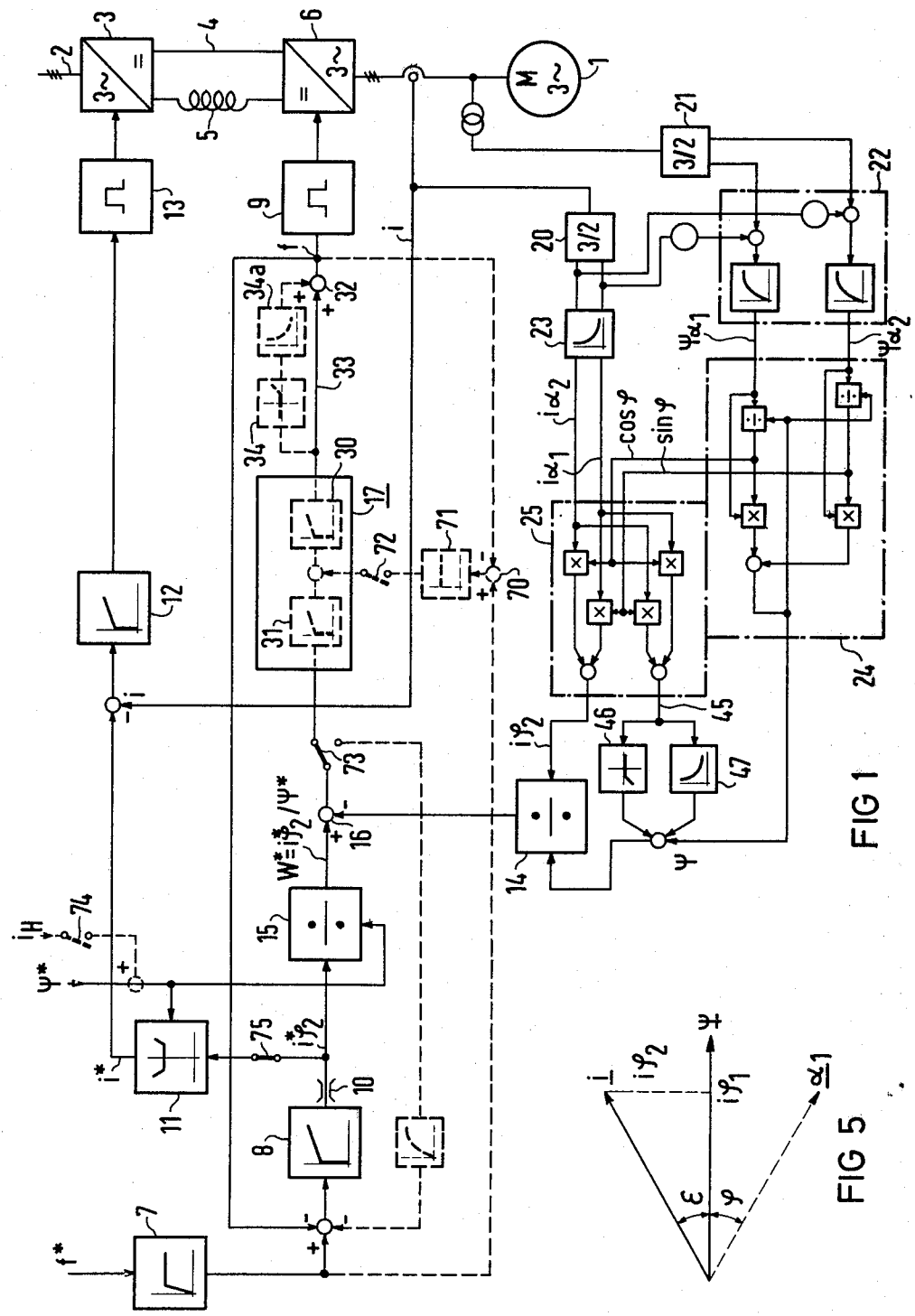
FIG. 1 is a block diagram of a circuit for control of an asynchronous motor, according to the teachings of the invention.

FIG. 1 shows a control for a rotating-field machine 1 in which the machine is fed by a frequency converter consisting of a line-controlled rectifier 3. Rectifier 3 is connected through a network connection 2 to a three-phase network, there being an intermediate DC link 4 having a smoothing choke 5, and a self-commutating converter (inverter) 6. A speed reference value f* can be set for the asynchronous machine 1 via a starting transmitter 7 provided for proper starting of the machine. A control difference of an actual speed value from the preset speed reference value f* is formed at the input of a speed control 8. A measured value, for instance, from a tachometer generator, can be used as the actual speed value. In the illustrated embodiment, the control variable for the stator frequency is used as the actual value and is fed back from the input of a control unit 9 which controls the valves of self-commutating converter 6.

The output of speed control 8 is fed through a current limiter 10 and a function generator 11 to a subordinated controller 12 the output of which acts on a control unit 13 to control the valves of line-commutated rectifier 3. The characteristic of the function generator 11 is set so that the reference value $i^* = \sqrt{i^{*2}_{\phi 1} + i^{*2}_{\phi 2}}$, which belongs to the presettable reference value of the main flux $\psi^*$, for instance the nominal flux for the stator current amplitude, is formed from the input variable $i^*_{\phi 2}$. Speed control 8 also feeds a control chain which acts through control unit 9, on the valves of self-commutating converter 6 and for which, in a first divider 14, the quotient W of the stator current component (active current) $i_{\phi 2}$ orthogonal to this vector and the absolute value of the main flux vector $\psi$ are formed as actual values. The output signal of the speed control is therefore the common input for the function generator (current control system) and for the control loop for the stator frequency.

In this control, the reference value $\psi^*$ for the flux is pre-set. The desired torque is obtained from the set value $i_{\phi 2}^*$ of the active current and is supplied either from the output of speed control 8 or is set-in at this point from an external generator. Function generator 11 adapts the set current value $i^*$ to $i^*_{\phi 2}$ so that the flux remains constant. Current controller 12, via the control unit 13, regulates the amplitude of the machine current, where the line current in leads 2, the current in intermediate link 4, or the machine current at the terminals of the asynchronous machine can be taken off as the appropriate actual value. Since, as a result of multiple commutation in the inverter, the machine current is smaller at higher frequencies than the line current or the intermediate-link current, but the decisive current for control is, in any case, the machine current, it is advantageous to utilize the machine current for control, at least at higher frequencies. At low frequencies, where the current cannot be measured readily with AC transformers, it may be advantageous to switch from measuring the machine current to measuring the AC line current.

The reference value W* of the load stage variable is calculated in a second divider 15 as the quotient of the active-current reference value $i^*_{\phi 2}$ which is present at the output of speed control 8, and the pre-set reference value of the flux $\psi^*$. From the control difference W*-W present at the input to comparator 16, a load state controller 17 forms the stator frequency control variable which is fed to control unit 9 as a control voltage. For W>W*, the stator frequency is lowered.

Such a control makes possible operation with field weakening. Thus, for example, it is possible to first pre-set the nominal flux as the reference value $\psi^*$, to measure the terminal voltage U, and, when a value $U_{max}$ is reached, to lower the reference value of the main flux $\psi^*$ by an amount which is formed at the output of an appropriate control and is derived from the control difference U-$U_{max}$. Exceeding the permissible motor voltage is thereby avoided; rather, in these cases the reference value W* in this control loop is increased and the machine is operated with constant voltage (weakened flux). If, on the other hand, one wishes to operate with constant flux throughout, then W* is proportional to $i^*_{\phi 2}$ and the output of speed control 8 can be used for forming the control difference directly without using a second divider.

The actual values for the active current component $i_{\phi 2}$ and the flux $\psi$ are calculated, in a manner known per se, from the terminal quantities for the stator current and the stator voltage taken off by means of measuring transformers. The asynchronous machine has three stator windings spatially shifted 120° relative to each other. At two of the three terminals, the instantaneous values for the stator current and the terminal voltage are measured and fed for recalculation in coordinate converters 20 and 21 into the components $i_{\alpha 1}$ and $U_{\alpha 1}$ and $U_{60\,2}$ of the stator current vector i and the stator voltage vector U, respectively, in a stator-related (stationary) Cartesian, two-axis reference system. The components $e_{\alpha 1}$, $e_{\alpha 2}$ of the EMF vector induced in the stator winding are calculated relative to this Cartesian coordinate system, from the relation $e_{\alpha 1,2} = U_{60\,1,2} - i_{\alpha 1,2} \cdot R$, in an EMF measuring device 22; the components $\psi_{\alpha 1}$ and $\psi_{\alpha 2}$ of the main flux vector are formed therefrom by integration. Since the actual values of this vector are falsified by the time behavior of the non-ideal integrators, a transmission element 23 having an appropriately falsifying time behavior is provided for the components of the stator current vector to obtain the same dynamics for the stator current vector and the flux vector in the further calculation. The angle $\phi$ which is enclosed by the flux vector $\psi$ and the abscissa $\alpha_1$ of the stator-related coordinate system is now determined. In the vector analyzer 24 only $\cos \phi = \psi_{\alpha 1}/\psi$ and $\sin \phi = \psi_{\alpha 2}/\psi$ are of interest here; for the formulation of these quantities, the variables $\psi_{\alpha 1}$ and $\psi_{\alpha 2}$ are divided by the magnitude $\psi$ of the flux vector in divider stages. This flux value $\psi = \psi_{\alpha 1}^2/\psi + \psi_{\alpha 2}^2/\psi$ is taken off at a junction point where the outputs of corresponding multipliers are summed, the multipliers being addressed by $\psi_{\alpha 1}$ and $\psi_{\alpha 2}$ as well as by the divider output signals. The variable $\psi$ obtained here is fed back to the divisor input of the dividers. The variable $i_{\phi 2}$ is calculated in a vector rotator 25 according to the transformation formula $i_{\phi 2} = -i_{\alpha 1} \sin \phi + i_{\alpha 2} \cos \phi$. In a further embodiment of the invention (to be described in detail later on), the magnetizing current $i_{\phi 1}$ is also calculated in vector rotator 25 according to the formula $i_{\phi 1} = i_{\alpha 1} \cos \phi + i_{\alpha 2} \sin \phi$. The calculated actual value of the active current $i_{\phi 2}$ is fed to the dividend input of divider 14.

The load state variable W which, corresponds, in the steady-state case, to the tangent of the load angle, is converted in controller 17 into a control variable for the stator frequency. Advantageously, the superimposed speed control uses, instead of the actual speed value, the stator frequency f which, in the steady state, differs only by the amount of the slip. Also, in order to make the actual value of the stator frequency also dynamically more similar to the speed, first divider stage 14 can be followed by a smoothing stage.

In order to illustrate the operation of the control, a motor load shock, transmitted on the shaft of the asynchronous machine, will be assumed. This lowers the speed, the slip is increased, and the flux breaks down. Reduced flux leads to an increase of the actual load-state value W, as a consequence of which load state control 17 decreases the control variable for the stator frequency and makes it follow the diminishing speed to keep the flux and the slip constant. The reduction of the stator frequency, however, leads to an increase of the output signal of speed control 8, i.e., an increase of the active-current reference values $i_{\phi 2}^*$. The result is temporarily higher torque which exceeds the load torque until the speed has again reached its original value and holds the torque at equilibrium with the load torque.

To protect the converter from overload currents, it is advantageous to limit the stator current to its rated value. Since the reference value of the magnetizing current $i_{\phi 1}^*$ is already given with the setting of the rated flux, the current limiting can be accomplished by limiting the active-current reference value $i^*_{\phi 2}$ at the output of speed control 8, under the assumption that the current control loop works very fast.

In this connection, it is advantageous to contruct the load state controller 17 from two PI-controllers in series: a W-control 30 proper and a preceding "drag control" 31. For, in order to make the stator frequency follow the speed in such a manner that the rated slip is not exceeded, in the event of a load state change which changes continuously, W-control 30 needs an input voltage at all times which must be "dragged along" until a new steady state is reached. For instance, a constant input voltage is required in order to vary the control variable for the stator frequency at the control output according to a ramp function. While approaching the steady state corresponding to the new load state, however, the actual flux value $\psi$ is to be held at the corresponding reference value.

This is now accomplished by a "drag control" 31, which applies a voltage to the input of control 30 in response to a small control deviation $W^* - W$ at the beginning of the load state change. Control 30 now causes the stator frequency to follow the speed change resulting from the load state change in such a way that the control difference $W^* - W$ vanishes. Control 30 continues the adjustment of stator frequency during the time the speed approaches the steady state of the new load state. The actual flux is made to follow the reference flux while the control maintains its constant output signal during this time. When the new steady state is reached, the output signal of W-control 30, which initially still changes, causes a brief, slight control deviation $W^* - W$ at the input of control 31, whereby the output signal of control 31 returns to zero. As a result, the output signal of control 30 remains at the value reached.

This improves the dynamics of load state control 17 substantially and the flux is also kept practically at the desired value when dynamic state changes occur. Good regulation is possible also if (for instance, upon starting up) the inverter is operated practically with the maximally permissible current load. In particular, the use of two controllers in series is advantageous if a reference value to be fed to the corresponding control unit is used as the speed value and not an actual value measured at the machine directly.

Since the stator current vector does not rotate continuously, but rotates in steps, in accordance with the driven coils of the stator winding, the active current $i_{\phi 2}$ and, therefore, the actual W-value, contains harmonics which interfere, especially at low frequencies. It is therefore advantageous to operate the load state control with low gain in that operating range. In motor operation, where the commutation delay angle has a damping-reducing effect, there is a danger of oscillations which can be damped by high controller gain. It is therefore advantageous to provide load state control 17 with an adaptor stage for increasing the control gain at high machine frequencies. In a preferred arrangement, a summing stage 32 is provided at the input to control unit 9 on which the output variable of load state control 17 is impressed directly by means of a parallel connecting line 33 and indirectly, via an amplifier 34, which has a more than proportionally increasing gain characteristic. It has further been found advantageous to provide a transmission stage 34a having the frequency response $F_A = sT_1/(1+sT_2)$ following amplifier 34. This stage has a smoothing and differentiating effect, so that changes in the control output variable are dynamically amplified without influencing the steady state. The constants $T_1$ and $T_2$ are not critical. These values can easily be found by optimizing for the individual application. Advantageous values are $T_1 = 100$ ms, $T_2 = 25$ ms.

Figure 2:
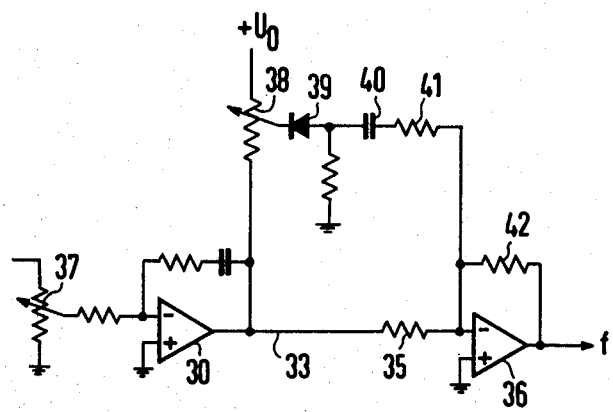
FIG. 2 is a schematic diagram of an adaptor stage for use on the output of the load state control of FIG. 1.

FIG. 2 shows a simple circuit for the adaptor stage. An operational amplifier 30 is connected as an IP-controller and serves as the load state control, being, for instance, the above-mentioned W-control. The control input is connected to the slider of a potentiometer 37 to which the output signal of drag control 31 is fed and by which the gain of control 30 can be set. The control output is connected via a line 33 and a resistor 35 to the input of a further operational amplifier 36. A voltage, which is chosen positive if the inverting inputs of operational amplifiers 30 and 36 are chosen for realizing the circuit, is also supplied to the control output via potentiometer 38. The slider of potentiometer 38 is connected, via series connected diode 39, capacitor 40, and resistor 41, to the input of another operational amplifier 36 having the feedback resistor 42. The output of diode 39 leading to capacitor 40 is advantageously grounded via a resistor.

For a given direction of rotation, the frequency control variable f (the output of the W-control) is negative; small values of f corresponds to low frequencies. Potentiometer 38 is set so that a small positive voltage is present at the slider. The diode is so connected that, with this voltage, it is cut off; it becomes conducting as soon as, with a higher frequency, the control output signal becomes more negative and the voltage taken off at potentiometer 38 drops. Therefore, at low frequencies (diode cut off), the gain of this circuit is determined by the ratio of the values of resistances 42 and 35, and at higher frequencies (diode conducting), the gain is determined by the ratio of the resistance of 42 to the resistance formed by resistors 35 and 41 in parallel. The setting-in point for the compensation (increase of gain) can be set by potentiometer 38.

Figure 3:
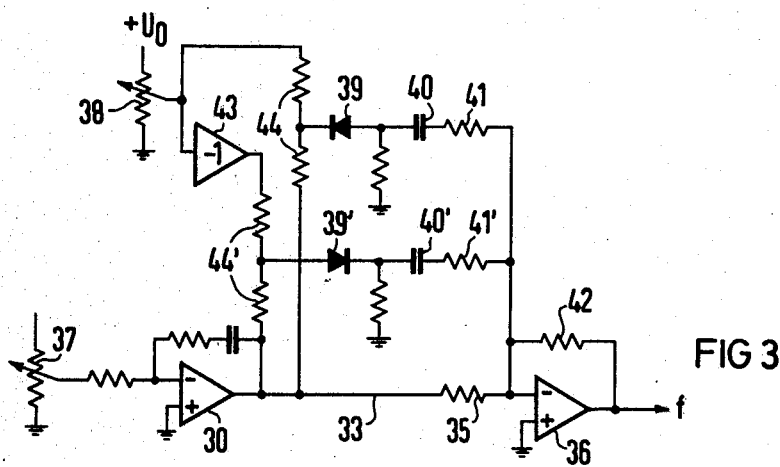
FIG. 3 is a schematic diagram of an adaptor stage like that of FIG. 2, but providing, in addition, for reverse rotation of the motor.

Reversal of direction of rotation of the machine can be brought about by reversing the sign of the frequency control variable f. In that case, a positive voltage is always present at the slider of potentiometer 38 and diode 39 of FIG. 2, is continuously cut off. For this circumstance, the circuit of FIG. 2 is replaced by FIG. 3, where the voltage taken off at potentiometer 38 is applied, via a voltage divider 44 and also via an inverter 43 and an associated voltage divider 44', to the output of control 30. The output of divider 44' (the inverted tapped potentiometer voltage) is also applied, via series connected diode 39', capacitor 40' and resistor 41', to the input of amplifier 36. Thereby, compensation is also achieved, in the manner explained above, when the sign of the frequency control variable f is reversed.

As already mentioned, the load state variable W corresponds, in the steady state, to the tangent of the load angle and, when the flux is constant, the torque corresponds to the active current component (and therefore, also, to the actual W-value). A larger torque reference value (i.e., $W^* - W > 0$) further increases the frequency; i.e., the slip and the load angle increase. While this means that the actual torque increases (as required) for load angles $<90°$ but decreases for load angles $>90°$, there is danger of fallout at load angles of about 90°. For, if, due to the effect of a disturbance (for instance, a frequency jump in stator frequency), the load angle is deflected suddenly from, say, 70° to 110°, no change of the magnetizing current component $i_{\phi 2} = i.\sin \Sigma$ takes place and, due to the large flux time constant, the flux $\psi$ also only changes slowly. The actual value W is therefore only slowly changed. For all practical purposes, the control at first does not react to the disturbance, and the machine pulls out. This can be prevented, however, by additional change in the actual W-value, which, when a limit for the load angle is exceeded, especially for load angles above 90° (i.e., for angles at which the flux-parallel magnitizing current component $i_{\phi 1}$ becomes negative), rapidly changes the control variable of the stator frequency in the event of fast angle changes.

This is advantageously achieved by providing for addition, at the divisor input of the divider 14, of the magnetizing current $i_{\phi 1}$, which also calculated in vector rotator 25, to the flux vector $\psi$, as soon as this current falls below a predetermined limit S. To this end, the $i_{\phi 1}$ output 45 of actual-value computer 25 is added via a blocking circuit 46 to the variable $\psi$ at the divisor input. The limit is advantageously chosen as a negative, or possibly, a small positive value, so that practically all positive $i_{\phi 1}$ values are blocked off, but negative values are added to $\psi$. The normal operating range (load angle less than 90°) is therefore not influenced by this circuit. However, when the load angle is increased beyond 90°, the denominator of the actual load-stage variable W is decreased; i.e., the actual W-value is suddenly increased. The frequency is therefore lowered via the load state control until an angle in the normal operating range is reached again. If the machine is to be operated, for instance, up to a load angle of 80°, then the threshold is chosen so that, at a load angle 110°, the magnetizing current belonging to the maximum stator current is still blocked off, but more negative magnetizing current values act on the denominator of the actual W-value. In this way the normal operation, in which the current vector oscillates $\pm 30°$ about a mean load angle, is not influenced by the blocking circuit, but, at larger load angles, produces a lowering of the stator frequency which prevents pulling-out.

It has further been found that the magnetizing current $i_{\phi 1}$ is also well suited for damping the load state control loop. The quotient $i_{\phi 2}/\phi$, because of the inertia of the flux, is an actual value which changes relatively slowly. This can lead to oscillations. A damping effect on the load state control is obtained if the (faster changing) actual value $i_{\phi 1}$ is dynamically added to the denominator of this quotient. The steady-state behavior of the control is to be uninfluenced, i.e., the actual magnetizing current value $i_{\phi 1}$ is added, via an "elastic" member 47 at the input of the divider 14, to the actual flux value $\psi$. Such an elastic member is characterized by a heavily decaying step response function, i.e., the elastic member reacts to a step-like enhanced input signal with a large positive but rapidly decaying output signal. This prevents oscillations of the flux.

Figure 4:
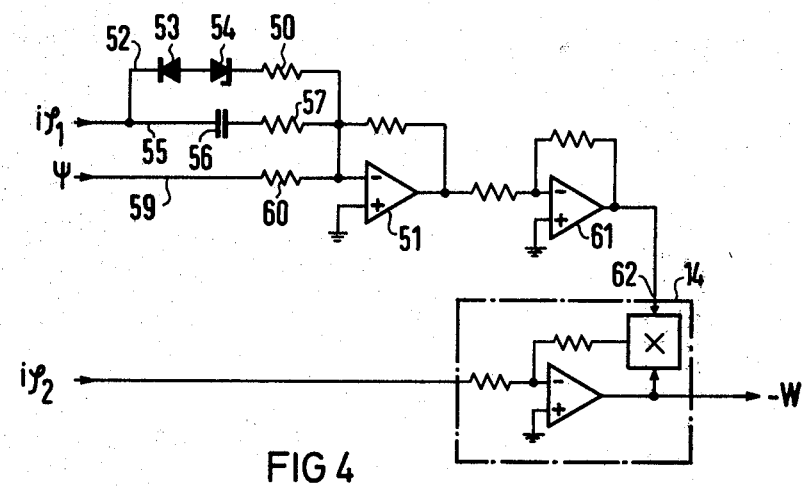
FIG. 4 is a schematic diagram of a divider for preventing oscillation of the flux.

In FIG. 4, a circuit arrangement for a divider 14 of this type is given. There, the divisor input of divider 14 is preceded by a blocking circuit 46 and an elastic element 47. A voltage $i_{\phi 1}$, taken off at output 45 of actual-value computer 25 causes a current to flow in a line 52 leading to the input of an operational amplifier 51 via a resistor 50; current in this line is passed by a series-connected diode 53, having the appropriate polarity, only when the currents are negative. A Zener diode 54, also connected in series with diode 53 and resistor 51, permits the negative current to flow only when it has $i_{\phi 1}$ values below the Zener threshold voltage. In a second, parallel, line 55, leading to the input of operational amplifier 51, a capacitor 56 ensures that a short charging current surge flows, via line 55, and a resistor 57, to the amplifier input only upon a change of the input voltage $i_{\phi1}$. The voltage $\psi$, taken off at actual value computer 25 and fed in on line 59, further results in a related current flowing to operational amplifier 51, via a resistor 60, so that a variable is present at the output of operational amplifier 51, which, in the steady state and at normal load angles, corresponds to the variable $\psi$, but is modified for load angles above 90° and/or upon changes in the magnetizing current component $i_{\phi1}$ in accordance with the explanations above. This output signal, which is inverted, if necessary, for establishing the correct polarity in an inverter 61, is fed to the divisor input 62 of divider 14; the dividend input of divider 14 being addressed by the actual value $i_{\phi2}$.

Since at very low frequencies, e.g., at frequencies below 10% of the nominal frequency, it is difficult to measure actual values for the stator current and the stator voltage without error, by means of measuring transformers, and since the calculation of the corresponding components of the current vector, the MF vector and the flux vector is inaccurate, difficulties can arise, particularly upon starting up.

These difficulties can be circumvented if the load state control loop is opened up at low frequencies and a corresponding control difference f*−f between the settable frequency reference value f* and the frequency control variable f is fed to the input of load control 17 instead of the control difference W*−W of the load state. In the arrangement shown in FIG. 1, where speed control 8 precedes the common input for the current control system and the load state control, this frequency control difference can be taken (as shown in the dashed lines) a suitable comparison point 70, amplified if necessary in a P-amplifier 71, and connected, via a switch 72, to the load state control. At low frequencies, switch 72 is closed and at the same time, the line for the control difference W*−W coming from the comparison point 16 is opened at a switch 73. Switches 72 and 73 therefore bring about switching from automatic stator frequency regulation to control of the stator frequency. In the case of a load state control consisting of two IP controls, switch 72 is fed to the input of second W-control 30. Drag control 31 is not in operation when the switch 73 is open. When an operational amplifier is used as the drag control, its output can, for instance, be short-circuited to the inverting input, so that the control output is at zero.

In a control of this kind, an increase of stator current leads to a larger torque only if the load angle is kept below 45°. To prevent the machine from falling out in this operating condition, a large magnetizing current is therefore run. For this purpose, a switch 74, which is held open in the normal operating condition and is closed at low frequencies, switches an additional magnetizing current reference value (starting current $i_H$) to the setting input for the flux reference value $\psi^*$. In this way a corresponding large current reference value i* is formed in function generator 11. It is advantageous to insert a disconnect switch 75 in series with input to function generator 11 for the set-in quantity $i^*_{\phi2}$; opening switch 75 decouples the function generator from speed control 8 at low frequencies. Function generator 11 then gives the reference value i* only in dependence on the starting current $i_H$ and does not react to fluctuations of the speed control output variable $i^*_{\phi2}$. To avoid a sudden change of the current reference value i* in the transition to normal operation (opening of switch 74), the latter can advantageously be followed by a smoothing stage.

In controlled operation, i.e., with switch 73 open, the above-described errors of the actual-value computer can lead to major control deviations at junction point 16. When the switching limit from controlled to regulated operation is reached, for instance upon reaching 10% of the nominal speed, switch 72 is opened and switch 73 (and possibly also switch 75) is closed. The control difference present at junction point 16 at this instant now leads first to an adjustment of the load state control and thus to a sudden frequency change until the now closed control loop has brought the control difference W*−W to zero. Such a switching shock can be avoided, however, if, simultaneously with the opening of switch 73, the control deviation present at linkage point 16 is fed back to the speed control and is subtracted from the quantity f*−f present at its input. To that end, switch 73 can be realized as a double-throw switch. This feedback makes the reference value $i^*_{\phi2}$ supplied by the speed control follow the actual value W calculated in divider 14 in such a manner that the difference W*−W at the linkage point vanishes. At the instant of switching over, speed control 8 as well as drag control 31 have the position corresponding to the vanishing control deviation, and a soft transition from controlled to regulated operation is accomplished.

What is claimed is:
1. An apparatus for controlling an asynchronous machine comprising:
   (a) a static frequency converter having a line-controlled rectifier with line-commutated rectifier valves connected to a three phase network,
   (b) a self-commutating converter supplying power to the machine,
   (c) an intermediate DC link coupling the output of the rectifier to the self-commutating converter,
   (d) a current control system including:
      (i) a current regulator for regulating the stator current of the asynchronous machine to a desired value by controlling the line-commutated rectifier valves, the current regulator having an input,
      (ii) input means for a reference flux variable, and
      (iii) a function generator having an input coupled to the input means for a reference flux variable and having an output coupled to the input of the current regulator, the function generator responsive to the reference flux variable for deriving the desired stator current value;
   (e) a parallel stator frequency control system including:
      (i) an actual value computer adapted to compute, from the actual values of stator current and stator voltage, a variable proportional to the amplitude of the flux vector and a variable proportional to the amplitude of the component of the stator current vector which is perpendicular to the flux vector as output signals;
      (ii) a load state control having an input and an output,
      (iii) means for providing actual values of the stator current and the stator voltage of the motor,
      (iv) a control unit for the self-commutated converter receiving a frequency control variable from the output of the load state control,
      (v) means coupled to the input of the load state control for forming a load state control signal comprising the difference between a load state variable calculated from the actual values of stator current and stator voltage and a load state reference value derived from the input variable to the function generator, (vi) a first divider having a dividend input to which the variable proportional to flux amplitude is fed, a divisor input to which the variable proportional to the stator current vector component perpendicular to the flux vector is fed, and an output signal comprising the load state variable; and (vii) means, responsive to the reference flux variable fed to the function generator, for deriving the load state reference value.

2. An apparatus in accordance with claim 1 in which the means for deriving the load state reference value comprises a second divider having a dividend input coupled to the input variable of the function generator and a divisor input and the reference flux variable is coupled to the divisor input of the second divider.

3. An apparatus in accordance with claim 1 in which the actual value computer is further adapted to calculate a variable proportional to the amplitude of the stator current vector component which is parallel to the flux vector and further comprising:

an elastic member having an input receiving the variable proportional to the amplitude of the stator current vector which is parallel to the flux vector and having an output; and an adder having an input to which the variable proportional to the current vector perpendicular to the flux vector is coupled and an output coupled to the divisor input of the first divider, the adder having a second input coupled to the output of the elastic member.

4. An apparatus in accordance with claim 3 in which the adder has a third input and further comprising:

a blocking circuit having an output coupled to the third input of the adder and having an input receiving the variable proportional to the amplitude of the stator current vector component which is parallel to the flux vector, the blocking circuit passing input signals below a predetermined value.

5. An apparatus in accordance with claim 4 in which: the load state control comprises two integrating-proportional controllers connected in series.

6. An apparatus in accordance with claim 1 and further comprising:

an adapter stage coupling the output of the load state control to the control unit for the self-commutated converter, the adapter stage comprising:

an adder having a first input coupled to the output of the load state control unit, a second input, and an output coupled to the input of the control unit; and an amplifier having a more than proportionally increasing gain characteristic, the amplifier having an input coupled to the output of the load state control and an output coupled to the second input of the adder.

7. An apparatus in accordance with claim 6 in which the output of the amplifier is coupled to the adder via a differentiating and smoothing element.

8. An apparatus in accordance with claim 2 in which the function generator has a second input and in which the means for supplying a reference variable to the second divider further comprises:

speed control means having an input and having an output coupled to the second input of the function generator and to the divisor input of the second divider; and comparator means, coupled to the input of the speed control means and having a settable reference frequency value and the frequency control variable as input signals, for forming a control deviation signal.

9. An apparatus in accordance with claim 8 and further comprising, for providing an input signal to the load state control during controlled operation at low frequencies:

comparison means having an input coupled to a settable frequency reference value and an input coupled to the frequency control variable and having a speed control difference signal as the output;

first switch means for disconnecting the load state control signal from the input to the load state control;

second switch means for connecting the speed control difference signal as input to the load state control, the first and second switch means being actuated together when the control apparatus is operated at low frequencies; and means for coupling a settable current value to the input of the function generator.

10. An apparatus in accordance with claim 9 and further comprising:

means for adding a magnetizing current reference value to the input reference flux value; and means for disconnecting the output of the speed control from the input to the function generator.

11. A control circuit in accordance with claim 9 in which the first switch means disconnects the load state control signal from the input to the load state control and connects the load state control signal as an additional input to the comparator means coupled to the input of the speed control.

* * * * *